United States Patent
Lee et al.

(10) Patent No.: US 10,111,166 B2
(45) Date of Patent: Oct. 23, 2018

(54) METHOD AND APPARATUS FOR PERFORMING ACCESS CONTROL FOR WLAN INTERWORKING IN WIRELESS COMMUNICATION SYSTEM

(71) Applicant: LG ELECTRONICS INC., Seoul (KR)

(72) Inventors: Jaewook Lee, Seoul (KR); Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/326,023

(22) PCT Filed: Jul. 27, 2015

(86) PCT No.: PCT/KR2015/007773
§ 371 (c)(1),
(2) Date: Jan. 12, 2017

(87) PCT Pub. No.: WO2016/018012
PCT Pub. Date: Feb. 4, 2016

(65) Prior Publication Data
US 2017/0201939 A1    Jul. 13, 2017

Related U.S. Application Data

(60) Provisional application No. 62/033,660, filed on Aug. 6, 2014, provisional application No. 62/030,619, filed on Jul. 30, 2014.

(51) Int. Cl.
*H04W 48/06* (2009.01)
*H04W 48/20* (2009.01)
(Continued)

(52) U.S. Cl.
CPC .......... *H04W 48/20* (2013.01); *H04W 48/16* (2013.01); *H04W 76/02* (2013.01); *H04W 76/10* (2018.02); *H04W 84/12* (2013.01)

(58) Field of Classification Search
CPC ..... H04W 48/20; H04W 76/02; H04W 48/16; H04W 84/12
See application file for complete search history.

(56) References Cited

U.S. PATENT DOCUMENTS 8,041,335 B2 * 10/2011 Khetawat ............. H04W 12/08
455/404.1
9,723,466 B2 * 8/2017 Koskela ................. H04W 4/22
(Continued)

FOREIGN PATENT DOCUMENTS

| WO | 2013022474 A1 | 2/2013 |
|---|---|---|
| WO | 2013051840 A2 | 4/2013 |
| WO | 2013112410 A1 | 8/2013 |

OTHER PUBLICATIONS

LG Electronics et al., "SCM Solutions for Prioritization of Mobile Originating Voice Services in E-UTRAN", 3GPP TSG-RAN WG2 #83bis, R2-133357, Sep. 27, 2013, 4 pages.
(Continued)

*Primary Examiner* — Jay P Patel
(74) *Attorney, Agent, or Firm* — Lee Hong Degerman Kang Waimey

(57) ABSTRACT

A method and apparatus for performing access control for wireless local area network (WLAN) interworking in a wireless communication system is provided. A user equipment (UE) receives access class barring information for a traffic steered from a WLAN to 3rd generation partnership project (3GPP) long-term evolution (LTE) from a network, and performs access barring check for the traffic steered from the WLAN to the 3GPP LTE using the received access class barring information. If a cell is not barred according to
(Continued)

the access barring check, the UE transmits a radio resource control (RRC) connection request message to the network.

7 Claims, 8 Drawing Sheets

(51) Int. Cl.
*H04W 48/16* (2009.01)
*H04W 76/02* (2009.01)
*H04W 76/10* (2018.01)
*H04W 84/12* (2009.01)

(56) References Cited

U.S. PATENT DOCUMENTS

| | | | | |
|---|---|---|---|---|
| 2009/0104905 A1* | 4/2009 | DiGirolamo | ......... | H04J 11/0093 455/434 |
| 2010/0105405 A1* | 4/2010 | Vujcic | ............ | H04J 13/22 455/452.1 |
| 2010/0172299 A1* | 7/2010 | Fischer | ............ | H04W 74/002 370/328 |
| 2010/0323736 A1* | 12/2010 | Fischer | ............ | H04W 74/004 455/509 |
| 2011/0274040 A1* | 11/2011 | Pani | ............ | H04W 4/005 370/328 |
| 2013/0170479 A1* | 7/2013 | Fong | ............ | H04W 74/085 370/336 |
| 2014/0128029 A1* | 5/2014 | Fong | ............ | H04W 48/12 455/411 |
| 2014/0161103 A1 | 6/2014 | Sirotkin et al. | | |
| 2015/0055494 A1* | 2/2015 | Zhou | ............ | H04W 28/0247 370/252 |
| 2015/0103651 A1* | 4/2015 | Kekki | ............ | H04W 28/0289 370/230 |
| 2015/0126147 A1* | 5/2015 | Koskela | ............ | H04W 4/22 455/404.1 |
| 2015/0304937 A1* | 10/2015 | Kim | ............ | H04W 48/14 370/230 |
| 2016/0095046 A1* | 3/2016 | Tervonen | ............ | H04W 48/14 370/338 |
| 2016/0219493 A1* | 7/2016 | Kim | ............ | H04W 48/06 |
| 2017/0019750 A1* | 1/2017 | Palanisamy | ......... | H04W 76/066 |
| 2017/0223609 A1* | 8/2017 | Fong | ............ | H04W 48/04 |
| 2017/0231029 A1* | 8/2017 | Pelletier | ............ | H04W 76/046 |

OTHER PUBLICATIONS

3rd Generation Partnership Project, "Technical Specification Group Radio Access Network; Evolved Universal Terrestrial Radio Access (E-UTRA); Radio Resource Control (RRC); Protocol specification (Release 11)", 3GPP TS 36.331 V11.0.0, Jun. 2012, section 5.3.3.1-5.3.3.2, pp. 38-40 (5 pages provided).

3rd Generation Partnership Project, "Technical Specification Group Radio Access Network; Evolved Universal Terrestrial Radio Access (E-UTRA); Radio Resource Control (RRC); Protocol specification (Release 11)", 3GPP TS 36.331 V11.0.0, Jun. 2012, section 5.3.3.11, pp. 44 (3 pages provided).

3rd Generation Partnership Project, "Technical Specification Group Services and System Aspects; Service accessibility (Release 13)", 3GPP TS 22.011 V13.0.0, Jun. 2014, section 4.3.1, pp. 16-17 (4 pages provided).

* cited by examiner

METHOD AND APPARATUS FOR PERFORMING ACCESS CONTROL FOR WLAN INTERWORKING IN WIRELESS COMMUNICATION SYSTEM

CROSS-REFERENCE TO RELATED APPLICATIONS

This application is the National Stage filing under 35 U.S.C. 371 of International Application No. PCT/KR2015/007773, filed on Jul. 27, 2015, which claims the benefit of U.S. Provisional Application Nos. 62/030,619, filed on Jul. 30, 2014 and 62/033,660, filed on Aug. 6, 2014, the contents of which are all hereby incorporated by reference herein in their entirety.

FIELD OF THE INVENTION

The present invention relates to wireless communications, and more particularly, to a method and apparatus for performing access control for wireless local area network (WLAN) interworking in a wireless communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

3GPP/wireless local area network (WLAN) interworking has been discussed. 3GPP/WLAN interworking may be called traffic steering. From rel-8 of 3GPP LTE, access network discovery and selection functions (ANDSF) for detecting and selecting accessible access networks have been standardized while interworking with non-3GPP access (e.g., WLAN) is introduced. The ANDSF may carry detection information of access networks accessible in location of a user equipment (UE) (e.g., WLAN, WiMAX location information, etc), inter-system mobility policies (ISMP) which is able to reflect operator's policies, and inter-system routing policy (ISRP). Based on the information described above, the UE may determine which Internet protocol (IP) traffic is transmitted through which access network. The ISMP may include network selection rules for the UE to select one active access network connection (e.g., WLAN or 3GPP). The ISRP may include network selection rules for the UE to select one or more potential active access network connection (e.g., both WLAN and 3GPP). The ISRP may include multiple access connectivity (MAPCON), IP flow mobility (IFOM) and non-seamless WLAN offloading. Open mobile alliance (OMA) device management (DM) may be used for dynamic provision between the ANDSF and the UE.

Various access control schemes may be defined in 3GPP LTE, which may include access class barring (ACB), extended access barring (EAB), service specific access control (SSAC), and application specific congestion control for data communication (ACDC). A method for performing access control for interworking between 3GPP LTE and WLAN may be required.

SUMMARY OF THE INVENTION

The present invention provides a method and apparatus for performing access control for wireless local area network (WLAN) interworking in a wireless communication system. The present invention provides a method and apparatus for defining access class barring information for traffic steered from WLAN. The present invention provides a method and apparatus for performing access control for traffic steered from WLAN.

In an aspect, a method for performing, by a user equipment (UE), access control in a wireless communication system is provided. The method includes receiving access class barring information for a traffic steered from a wireless local area network (WLAN) to 3rd generation partnership project (3GPP) long-term evolution (LTE) from a network, performing access barring check for the traffic steered from the WLAN to the 3GPP LTE using the received access class barring information, and transmitting a radio resource control (RRC) connection request message to the network, if a cell is not barred according to the access barring check.

In another aspect, a user equipment (UE) includes a memory, a transceiver, and a processor coupled to the memory and the transceiver, and configured to control the transceiver to receive access class barring information for a traffic steered from a wireless local area network (WLAN) to 3rd generation partnership project (3GPP) long-term evolution (LTE) from a network, perform access barring check for the traffic steered from the WLAN to the 3GPP LTE using the received access class barring information, and control the transceiver to transmit a radio resource control (RRC) connection request message to the network, if a cell is not barred according to the access barring check.

Access control for interworking between 3GPP LTE and WLAN can be performed efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
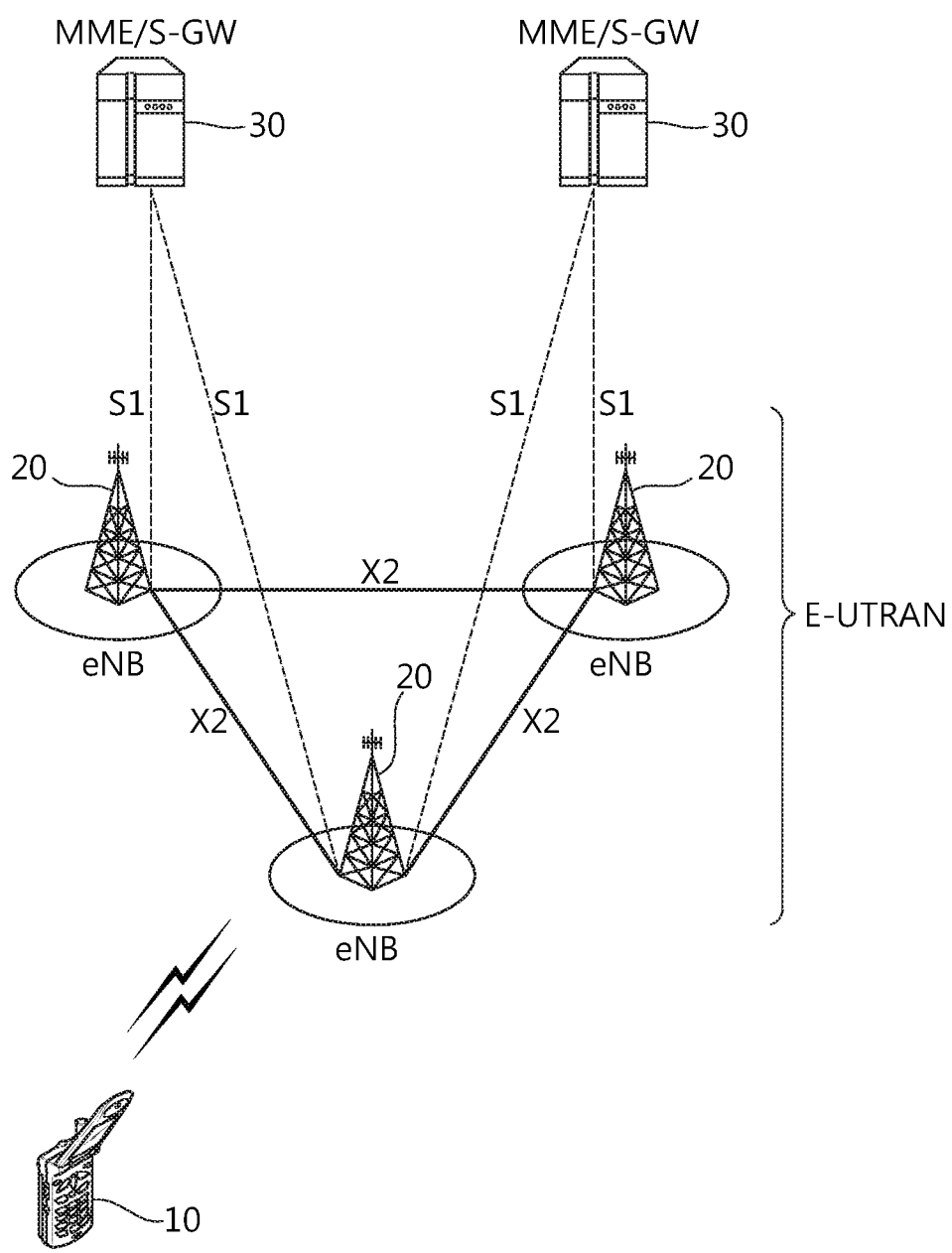
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
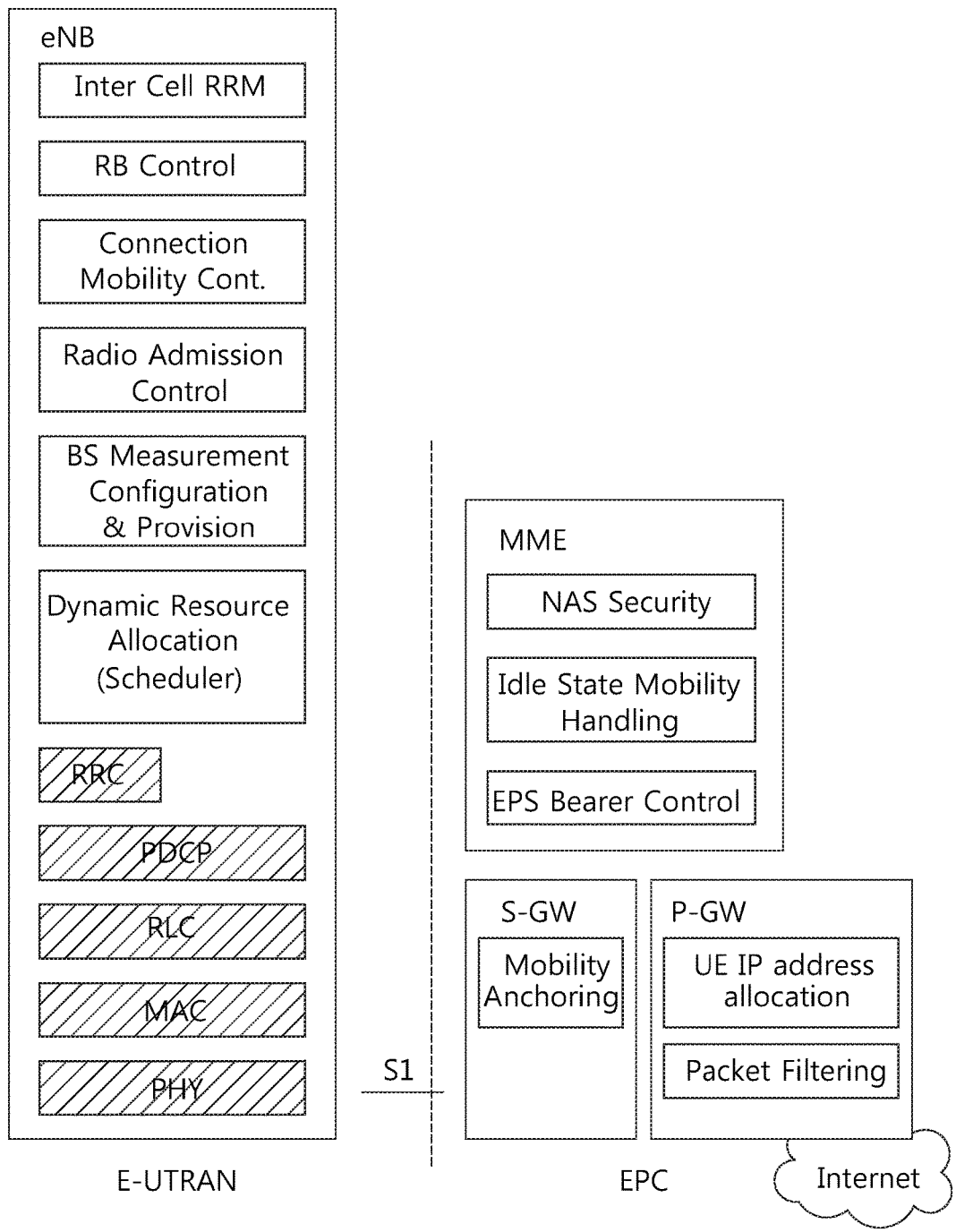
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
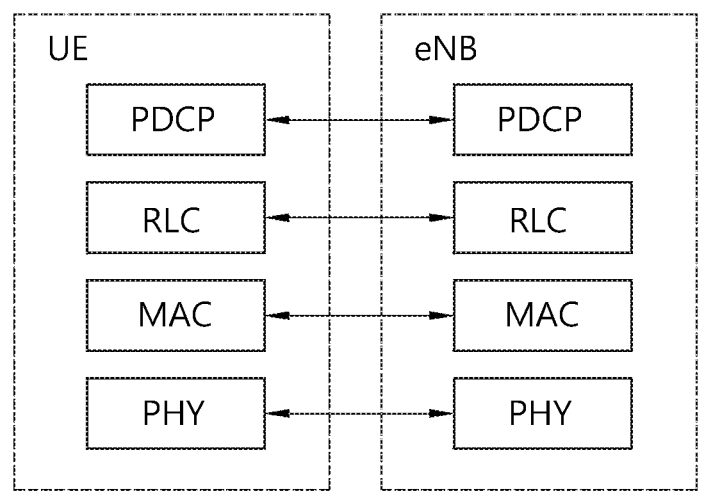
FIG. 3 shows a block diagram of a user plane protocol stack of an LTE system.
Figure 4:
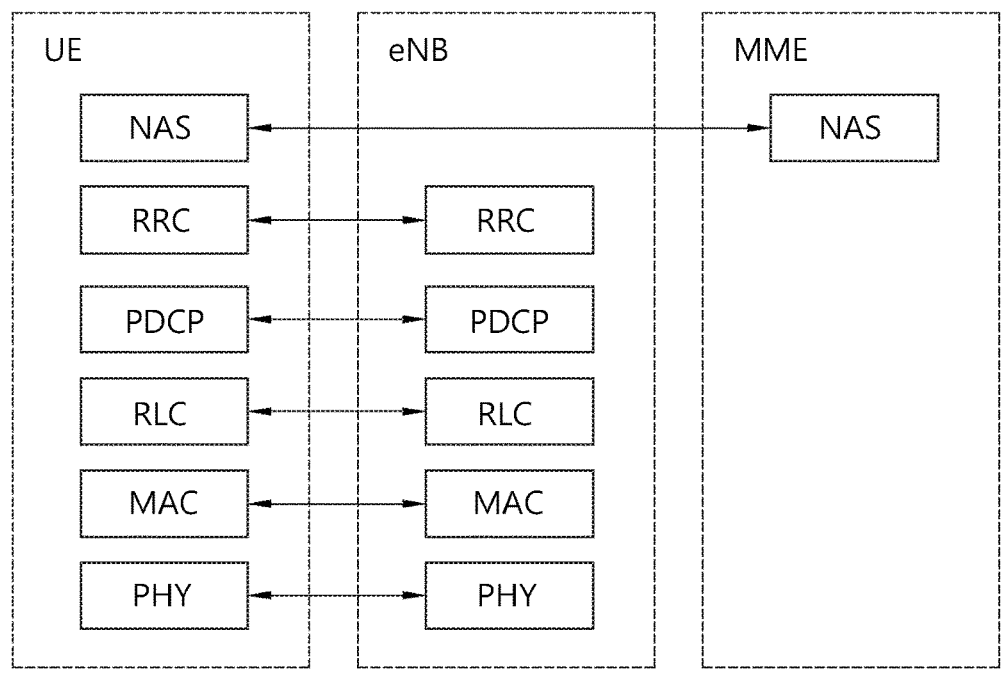
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
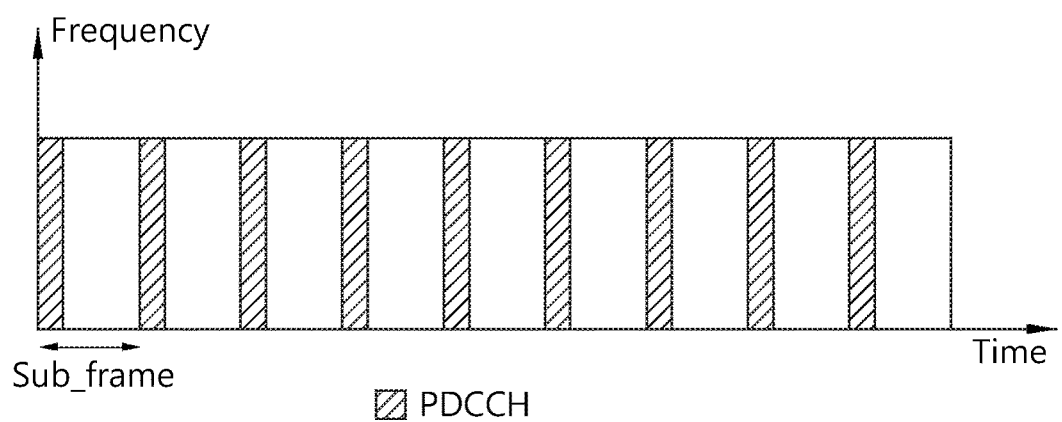
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Since rel-8, 3GPP has standardized access network discovery and selection functions (ANDSF), which is for interworking between 3GPP access network and non-3GPP access network (e.g. wireless local area network (WLAN)). The ANDSF management object (MO) is used to manage inter-system mobility policy (ISMP) and inter-system routing policy (ISRP) as well as access network discovery information stored in a UE supporting provisioning of such information from an ANDSF.

The ANDSF may initiate the provision of information from the ANDSF to the UE. The relation between ISMP, ISRP and discovery information is that ISMP prioritize the access network when the UE is not capable to connect to the EPC through multiple accesses, ISRP indicate how to distribute traffic among available accesses when the UE is capable to connect to the EPC through multiple accesses (i.e. the UE is configured for IP flow mobility (IFOM), multiple access connectivity (MAPCON), non-seamless WLAN offload or any combination of these capabilities), while discovery information provide further information for the UE to access the access network defined in the ISMP or in the ISRP. The MO defines validity areas, position of the UE and availability of access networks in terms of geographical coordinates. The UE is not required to switch on all UE's supported radios for deducing its location for ANDSF purposes or for evaluating the validity area condition of a policy or discovery information. The UE shall discard any node which is a child of the ANDSF MO root node and is not supported by the UE. The ANDSF server shall discard any node which is a child of the ANDSF MO root node and is not supported by the ANDSF server.

In addition to ANDSF, additional policy may be specified in RAN specification for interworking between 3GPP access network (e.g. E-UTRAN) and non-3GPP access network (e.g. WLAN). The additional policy for interworking between 3GPP access network and non-3GPP access network may be referred to as RAN rule. Hereinafter, interworking between 3GPP access network (e.g. E-UTRAN) and non-3GPP access network (e.g. WLAN) may be referred to as traffic steering.

Access network selection and traffic steering between E-UTRAN and WLAN is described. The mechanism to support traffic steering between E-UTRAN and WLAN may be described. Specifically, E-UTRAN assisted UE based bi-directional traffic steering between E-UTRAN and WLAN for UEs in RRC_IDLE and RRC_CONNECTED may be supported.

E-UTRAN provides assistance parameters via broadcast and dedicated RRC signaling to the UE. The RAN assistance parameters may include E-UTRAN signal strength and quality thresholds, WLAN channel utilization thresholds, WLAN backhaul data rate thresholds, WLAN signal strength and quality thresholds and offload preference indicator (OPI). E-UTRAN can also provide a list of WLAN identifiers to the UE via broadcast signaling. WLANs provided by E-UTRAN may include an associated priority. The UE uses the RAN assistance parameters in the evaluation of traffic steering rules or access network discovery and selection function (ANDSF) policies, for traffic steering decisions between E-UTRAN and WLAN. The OPI is only used in ANDSF policies. WLAN identifiers are only used in traffic steering rules.

If the UE is provisioned with ANDSF policies it shall forward the received RAN assistance parameters to upper layers, otherwise it shall use them in the traffic steering rules. The traffic steering rules are applied only to the WLANs of which identifiers are provided by the E-UTRAN. The UE in RRC_CONNECTED shall apply the parameters obtained via dedicated signaling if such have been received from the serving cell. Otherwise, the UE shall apply the parameters obtained via broadcast signaling. The UE in RRC_IDLE shall keep and apply the parameters obtained via dedicated signaling, until cell reselection or a timer has expired since the UE entered RRC_IDLE upon which the UE shall apply the parameters obtained via broadcast signaling. In the case of RAN sharing, each PLMN sharing the RAN can provide independent sets of RAN assistance parameters.

The UE indicates to upper layers when (and for which WLAN identifiers along with associated priorities, if any) access network selection and traffic steering rules are fulfilled. The selection among WLAN APs that fulfil the access network selection and traffic steering rules is up to UE implementation. When the UE applies the access network selection and traffic steering rules, it performs traffic steering between E-UTRAN WLAN with APN granularity.

For access network selection and traffic steering between E-UTRAN and WLAN, RAN assistance parameters may be provided. When the UE is in RRC_IDLE, RAN assistance parameters may be provided to the UE in SystemInformationBlockType17 or in the RRCConnectionReconfiguration message. RAN assistance parameters received in SystemInformationBlockType17 are valid only if the UE is camped on a suitable cell. The UE shall discard the RAN assistance parameters upon cell reselection. Upon T350 expiry, the UE shall discard the RAN assistance parameters received in the RRCConnectionReconfiguration message and apply the RAN assistance parameters received in SystemInformationBlockType17. The UE shall forward to the upper layers the current RAN assistance parameters either when new parameters are received or when parameters are discarded.

Access network selection and traffic steering rules are only applicable for a WLAN for which an identifier has been signaled to the UE by the E-UTRAN and the UE is capable of traffic steering between E-UTRAN and WLAN.

The UE shall indicate to the upper layers when and for which WLAN identifiers the following conditions 1 and 2 for steering traffic from E-UTRAN to WLAN are satisfied for a time interval $Tsteering_{WLAN}$. $Tsteering_{WLAN}$ specifies the timer value during which the rules should be fulfilled before starting traffic steering between E-UTRAN and WLAN. WLAN identifiers may be service set IDs (SSIDs), basic service set IDs (BSSIDs) or homogeneous extended service set IDs (HESSIDs).

1. In the E-UTRAN serving cell:
    $RSRPmeas < Thresh_{ServingOffloadWLAN, LowP}$; or
    $RSRQ < Thresh_{ServingOffloadWLAN, LowQ}$;
2. In the target WLAN:
    $ChannelUtilizationWLAN < Thresh_{ChUtilWLAN, Low}$; and
    $BackhaulRateDlWLAN > Thresh_{BackhRateDLWLAN, High}$; and
    $BackhaulRateUlWLAN > Thresh_{BackhRateULWLAN, High}$; and
    $RCPI > Thresh_{RCPIWLAN, High}$; and
    $RSNI > Thresh_{RSNIWLAN, High}$;

In the above conditions, RSRPmeas is Qrxlevmeas in RRC_IDLE, which is measured cell RX level value, and primary cell (PCell) reference signal received power (RSRP) in RRC_CONNECTED. RSRQmeas is Qqualmeas in RRC_IDLE, which is measured cell quality value, and PCell reference signal received quality (RSRQ) In RRC_CONNECTED ChannelUtilizationWLAN is WLAN channel utilization. BackhaulRateDlWLAN is WLAN backhaul available DL bandwidth. BackhaulRateUlWLAN is WLAN backhaul available UL bandwidth. RCPI is WLAN received channel power indicator. RSNI is WLAN received signal to noise indicator. $Thresh_{ServingOffloadWLAN, LowP}$ specifies the RSRP threshold (in dBm) used by the UE for traffic steering to WLAN. $Thresh_{ServingOffloadWLAN, LowQ}$ specifies the RSRQ threshold (in dB) used by the UE for traffic steering to WLAN. $Thresh_{ChUtilWLAN, Low}$ specifies the WLAN channel utilization (BSS load) threshold used by the UE for traffic steering to WLAN. $Thresh_{BackhRateDLWLAN, High}$ specifies the backhaul available downlink bandwidth threshold used by the UE for traffic steering to WLAN. $Thresh_{BackhRateULWLAN, High}$ specifies the backhaul available uplink bandwidth threshold used by the UE for traffic steering to WLAN. The above parameters for access network selection and traffic steering between 3GPP and WLAN may be broadcast in system information and are read from the E-UTRAN serving cell. $Thresh_{RCPIWLAN, High}$ specifies the RCPI threshold used by the UE for traffic steering to WLAN. $Thresh_{RSNIWLAN, High}$ specifies the RSNI threshold used by the UE for traffic steering to WLAN.

The UE shall exclude the evaluation of a measurement for which a threshold has not been provided. The UE shall evaluate the E-UTRAN conditions on PCell only. If not all metrics related to the provided thresholds can be acquired for a WLAN, the UE shall exclude that WLAN from the evaluation of the above rule.

Along with the indication, the UE shall indicate to the upper layers the priorities for the WLAN identifiers if provided by the E-UTRAN.

The UE shall indicate to the upper layers when the following conditions 3 or 4 for steering traffic from WLAN to E-UTRAN are satisfied for a time interval $Tsteering_{WLAN}$:

3. In the source WLAN:
ChannelUtilizationWLAN>$Thresh_{ChUtilWLAN, High}$; or
BackhaulRateDlWLAN<$Thresh_{BackhRateDLWLAN, Low}$; or
BackhaulRateUlWLAN<$Thresh_{BackhRateULWLAN, Low}$; or
RCPI<$Thresh_{RCPIWLAN, Low}$; or
RSNI<$Thresh_{RSNIWLAN, Low}$;
4. In the target E-UTRAN cell:
RSRPmeas>$Thresh_{ServingOffloadWLAN, HighP}$; and
RSRQmeas>$Thresh_{ServingOffloadWLAN, HighQ}$;

In the above conditions, $Thresh_{ChUtilWLAN, High}$ specifies the WLAN channel utilization (BSS load) threshold used by the UE for traffic steering to E-UTRAN. $Thresh_{BackhRateDLWLAN, Low}$ specifies the backhaul available downlink bandwidth threshold used by the UE for traffic steering to E-UTRAN. $Thresh_{BackhRateULWLAN, Low}$ specifies the backhaul available uplink bandwidth threshold used by the UE for traffic steering to E-UTRAN. $Thresh_{RCPIWLAN, Low}$ specifies the RCPI threshold used by the UE for traffic steering to E-UTRAN. $Thresh_{RSNIWLAN, Low}$ specifies the RSNI threshold used by the UE for traffic steering to E-UTRAN. $Thresh_{ServingOffloadWLAN, HighP}$ specifies the RSRP threshold (in dBm) used by the UE for traffic steering to E-UTRAN. $Thresh_{ServingOffloadWLAN, HighQ}$ specifies the RSRQ threshold (in dB) used by the UE for traffic steering to E-UTRAN.

The UE shall exclude the evaluation of a measurement for which a threshold has not been provided. The UE shall evaluate the E-UTRAN conditions on PCell only. If not all metrics related to the provided thresholds can be acquired for a WLAN, the UE shall exclude that WLAN from the evaluation of the above rule.

RRC Connection establishment procedure is described. It may be referred to Section 5.3.3.1 and 5.3.3.2 of 3GPP TS 36.331 V11.0.0 (2012 June). The purpose of this procedure is to establish an RRC connection. RRC connection establishment involves signaling radio bearer 1 (SRB1) establishment. The procedure is also used to transfer the initial NAS dedicated information/message from the UE to E-UTRAN. E-UTRAN applies the procedure to establish SRB1 only.

The UE initiates the procedure when upper layers request establishment of an RRC connection while the UE is in RRC_IDLE. Upon initiation of the procedure, the UE shall:

1> if upper layers indicate that the RRC connection is subject to extended access barring (EAB):
2> if the result of the EAB check is that access to the cell is barred:
3> inform upper layers about the failure to establish the RRC connection and that EAB is applicable, upon which the procedure ends;
1> if the UE is establishing the RRC connection for mobile terminating calls:
2> if timer T302 is running:
3> inform upper layers about the failure to establish the RRC connection and that access barring for mobile terminating calls is applicable, upon which the procedure ends;
1> else if the UE is establishing the RRC connection for emergency calls:
2> if SystemInformationBlockType2 includes the ac-BarringInfo:
3> if the ac-BarringForEmergency is set to TRUE:
4> if the UE has one or more access classes, as stored on the universal subscriber identification module (USIM), with a value in the range 11 . . . 15, which is valid for the UE to use:
5> if the ac-BarringInfo includes ac-BarringForMO-Data, and for all of these valid access classes for the UE, the corresponding bit in the ac-BarringForSpecialAC contained in ac-BarringForMO-Data is set to one:
6> consider access to the cell as barred;
4> else:
5> consider access to the cell as barred;
2> if access to the cell is barred:
3> inform upper layers about the failure to establish the RRC connection, upon which the procedure ends;
1> else if the UE is establishing the RRC connection for mobile originating calls:
2> perform access barring check using T303 as "Tbarring" and ac-BarringForMO-Data as "AC barring parameter";
2> if access to the cell is barred:
3> if SystemInformationBlockType2 includes ac-BarringForCSFB or the UE does not support circuit-switched ( )CS fallback:
4> inform upper layers about the failure to establish the RRC connection and that access barring for mobile originating calls is applicable, upon which the procedure ends;
3> else (SystemInformationBlockType2 does not include ac-BarringForCSFB and the UE supports CS fallback):
4> if timer T306 is not running, start T306 with the timer value of T303;
4> inform upper layers about the failure to establish the RRC connection and that access barring for mobile originating calls and mobile originating CS fallback is applicable, upon which the procedure ends;
1> else if the UE is establishing the RRC connection for mobile originating signaling:
2> perform access barring check using T305 as "Tbarring" and ac-BarringForMO-Signalling as "AC barring parameter";
2> if access to the cell is barred:
3> inform upper layers about the failure to establish the RRC connection and that access barring for mobile originating signalling is applicable, upon which the procedure ends;
1> else (the UE is establishing the RRC connection for mobile originating CS fallback):
2> if SystemInformationBlockType2 includes ac-BarringForCSFB:
3> perform access barring check using T306 as "Tbarring" and ac-BarringForCSFB as "AC barring parameter";

3> if access to the cell is barred:
4> inform upper layers about the failure to establish the RRC connection and that access barring for mobile originating CS fallback is applicable, due to ac-BarringForCSFB, upon which the procedure ends;
2> else:
3> perform access barring check using T306 as "Tbarring" and ac-BarringForMO-Data as "AC barring parameter";
3> if access to the cell is barred:
4> if timer T303 is not running, start T303 with the timer value of T306;
4> inform upper layers about the failure to establish the RRC connection and that access barring for mobile originating CS fallback and mobile originating calls is applicable, due to ac-BarringForMO-Data, upon which the procedure ends;
1> apply the default physical channel configuration;
1> apply the default semi-persistent scheduling configuration;
1> apply the default MAC main configuration;
1> apply the CCCH configuration;
1> apply the timeAlignmentTimerCommon included in SystemInformationBlockType2;
1> start timer T300;
1> initiate transmission of the RRCConnectionRequest message;

Access class barring (ACB) check is described. It may be referred to Section 5.3.3.11 of 3GPP TS 36.331 V11.0.0 (2012 June) and/or Section 4.3.1 of 3GPP TS 22.011 V13.0.0 (2014 June). If the UE is a member of at least one access class which corresponds to the permitted classes as signaled over the air interface, and the access class is applicable in the serving network, access attempts are allowed. Additionally, in the case of the access network being UTRAN the serving network can indicate that UEs are allowed to respond to paging and perform location registration, even if their access class is not permitted. Otherwise access attempts are not allowed. Also, the serving network can indicate that UEs are restricted to perform location registration, although common access is permitted. If the UE responded to paging it shall follow the normal defined procedures and react as specified to any network command.
1> if timer T302 or "Tbarring" is running:
2> consider access to the cell as barred;
1> else if SystemInformationBlockType2 includes "AC barring parameter":
2> if the UE has one or more ACs, as stored on the USIM, with a value in the range 11 ... 15, which is valid for the UE to use (ACs 12, 13, 14 are only valid for use in the home country and ACs 11, 15 are only valid for use in the home PLMN (HPLMN)/equivalent HPLMN (EH-PLMN)), and
2> for at least one of these valid Access Classes the corresponding bit in the ac-BarringForSpecialAC contained in "AC barring parameter" is set to zero:
3> consider access to the cell as not barred;
2> else:
3> draw a random number 'rand' uniformly distributed in the range: 0≤rand<1;
3> if 'rand' is lower than the value indicated by ac-BarringFactor included in "AC barring parameter":
4> consider access to the cell as not barred;
3> else:
4> consider access to the cell as barred;
1> else:
2> consider access to the cell as not barred;
1> if access to the cell is barred and both timers T302 and "Tbarring" are not running:
2> draw a random number 'rand' that is uniformly distributed in the range 0≤rand<1;
2> start timer "Tbarring" with the timer value calculated as follows, using the ac-BarringTime included in "AC barring parameter":

"$Tbarring$"$=(0.7+0.6*rand)*ac$-$BarringTime$.

The SystemInformationBlockType2 information element (IE) (hereinafter, SIB2) contains radio resource configuration information that is common for all UEs. Table 1 shows an example of the SIB2. The SIB2 includes parameters for the ACB described above.

TABLE 1

```
--ASN1START
SystemInformationBlockType2 ::=         SEQUENCE {
    ac-BarringInfo                          SEQUENCE {
        ac-BarringForEmergency                  BOOLEAN,
        ac-BarringForMO-Signalling              AC-BarringConfig
OPTIONAL,   -- Need OP
        ac-BarringForMO-Data                            AC-BarringConfig
OPTIONAL   -- Need OP
    }
OPTIONAL,   -- Need OP
    radioResourceConfigCommon               RadioResourceConfigCommonSIB,
    ue-TimersAndConstants                   UE-TimersAndConstants,
    freqInfo                                SEQUENCE {
        ul-CarrierFreq                              ARFCN-ValueEUTRA
OPTIONAL,   -- Need OP
        ul-Bandwidth                                ENUMERATED {n6, n15, n25,
n50, n75, n100}
OPTIONAL,   -- Need OP
        additionalSpectrumEmission                  AdditionalSpectrumEmission
    },
    mbsfn-SubframeConfigList                MBSFN-SubframeConfigList
OPTIONAL,   -- Need OR
    timeAlignmentTimerCommon                TimeAlignmentTimer,
    ...,
    lateNonCriticalExtension        OCTET STRING (CONTAINING
SystemInformationBlockType2-v8h0-IEs)
```

TABLE 1-continued

```
OPTIONAL,   -- Need OP
   [[ ssac-BarringForMMTEL-Voice-r9         AC-BarringConfig
OPTIONAL,   -- Need OP
         ssac-BarringForMMTEL-Video-r9         AC-BarringConfig
OPTIONAL    -- Need OP
   ]],
   [[ ac-BarringForCSFB-r10                 AC-BarringConfig
OPTIONAL    -- Need OP
   ]]
}
SystemInformationBlockType2-v8h0-IEs ::=    SEQUENCE {
      multiBandInfoList       SEQUENCE (SIZE (1..maxMultiBands)) OF
AdditionalSpectrumEmission
OPTIONAL,   -- Need OR
      nonCriticalExtension    SystemInformationBlockType2-v9e0-IEs
OPTIONAL    -- Need OP
}
SystemInformationBlockType2-v9e0-IEs ::= SEQUENCE {
      ul-CarrierFreq-v9e0                        ARFCN-ValueEUTRA-v9e0
OPTIONAL, -- Cond ul-FreqMax
      nonCriticalExtension              SEQUENCE { }
OPTIONAL    -- Need OP
}
AC-BarringConfig ::=              SEQUENCE {
   ac-BarringFactor             ENUMERATED {
                                 p00, p05, p10, p15, p20, p25, p30, p40,
                                 p50, p60, p70, p75, p80, p85, p90, p95},
   ac-BarringTime               ENUMERATED {s4, s8, s16, s32, s64, s128, s256,
s512},
   ac-BarringForSpecialAC       BIT STRING (SIZE(5))
}
MBSFN-SubframeConfigList ::=SEQUENCE (SIZE (1..maxMBSFN-Allocations))
OF MBSFN-SubframeConfig
-- ASN1STOP
```

Referring to Table 1, the ac-BarringFactor field indicates a reference for ACB. If the random number drawn by the UE is lower than this value, access is allowed. Otherwise the access is barred. The ac-BarringForCSFB field indicates ACB for mobile originating (MO) circuit-switch (CS) fallback. The ac-BarringForEmergency field indicates ACB for AC 10. The ac-BarringForMO-Data field indicates ACB for MO calls. The ac-BarringForMO-Signalling field indicates ACB for MO signaling. The ac-BarringForSpecialAC field indicates ACB for AC 11-15. The first/leftmost bit is for AC 11, the second bit is for AC 12, and so on. The ac-BarringTime field indicates access barring time value in seconds.

By interworking between 3GPP LTE and WLAN, there may be a case that the UE actively transmits/receives traffic over WLAN, while the UE stays in RRC_IDLE during interworking between 3GPP LTE and WLAN. For example, after steering the on-going traffic from 3GPP LTE to WLAN, the UE may transit to RRC_IDLE if there is no traffic transmission/reception in 3GPP LTE. Or, the UE staying in RRC_IDLE may directly initiate the transmission over WLAN according the RAN rule. In this case, the UE staying in RRC_IDLE is required to establish an RRC connection if the traffic steering from WLAN to 3GPP LTE is triggered due to, e.g. going out of WLAN area.

However, during the establishment of the RRC connection, it is possible that the UE has to defer the initiation of request of RRC connection excessively due to access class barring or failure of random access procedure. In addition, the network may reject the RRC connection request for the UE trying to steer the on-going traffic from WLAN to 3GPP LTE, while the network accepts the RRC connection request for the UE which newly initiates the traffic transmission. Generally, blocking a handover request is less desirable than blocking of a new call request in terms of guaranteeing the quality of service (QoS) of the traffic. Similarly, blocking a RRC connection request initiated by on-going traffic steered from WLAN to 3GPP LTE may also be less desirable than blocking a RRC connection request initiated by new traffic transmission.

In order to solve the problem described above, it may be necessary to devise mechanism to differentiate an RRC connection request initiated by on-going traffic steered from WLAN to 3GPP LTE, from an RRC connection request initiated by other reasons, i.e. conventional traffic. Hereinafter, a method for performing access control for an RRC connection request initiated by on-going traffic steered from WLAN to 3GPP LTE according to an embodiment of the present invention is described. According to an embodiment of the present invention, access class barring information for on-going traffic steered from WLAN to 3GPP LTE may be newly defined. The access class barring information for on-going traffic steered from WLAN to 3GPP LTE may be used to bar the on-going traffic steered from WLAN to 3GPP LTE as least as possible, since blocking a RRC connection request initiated by on-going traffic steered from WLAN to 3GPP LTE may be not desirable.

Figure 6:
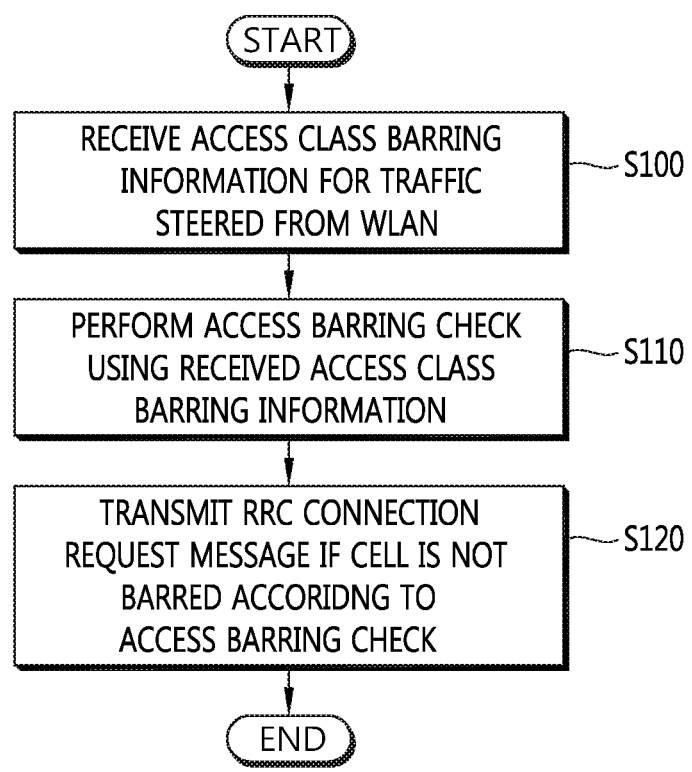
FIG. 6 shows an example of a method for performing access control according to an embodiment of the present invention.

FIG. 6 shows an example of a method for performing access control according to an embodiment of the present invention. In this embodiment, it is assumed that the UE is ready to initiate RRC connection establishment caused by the on-going traffic steered from WLAN to 3GPP LTE.

In step S100, the UE receives newly defined access class barring information for traffic steered from WLAN to 3GPP LTE from the network. The newly defined access class barring information may be provided via broadcast signaling, like conventional access class barring information. The access class barring information for traffic steered from WLAN to 3GPP LTE may follow ACB parameters described in Table 1. That is, the access class barring information for traffic steered from WLAN to 3GPP LTE may include ac-BarringFactor and ac-BarringTime.

Upon receiving the newly defined access class barring information for traffic steered from WLAN to 3GPP LTE, the UE stores the received information. When the criterion of traffic steering from WLAN to 3GPP LTE is satisfied, upper layers of the UE request establishment of an RRC connection while the UE is in RRC_IDLE. In step S110, the UE performs access barring check using the received access class barring information. Access barring check for the RRC connection initiated by the on-going traffic steered from WLAN to 3GPP LTE may be as follows.

1> if timer T302 or "Tbarring" is running:
2> consider access to the cell as barred;
1> else if SystemInformationBlockType2 includes "AC barring parameter" for steering from WLAN:
2> if the UE has one or more ACs, as stored on the USIM, with a value in the range 11 . . . 15, which is valid for the UE to use (ACs 12, 13, 14 are only valid for use in the home country and ACs 11, 15 are only valid for use in the home PLMN (HPLMN)/equivalent HPLMN (EHPLMN)), and
2> for at least one of these valid Access Classes the corresponding bit in the ac-BarringForSpecialAC contained in "AC barring parameter" is set to zero:
3> consider access to the cell as not barred;
2> else:
3> draw a random number 'rand' uniformly distributed in the range: 0≤rand<1;
3> if 'rand' is lower than the value indicated by ac-BarringFactor included in "AC barring parameter" for steering from WLAN:
4> consider access to the cell as not barred;
3> else:
4> consider access to the cell as barred;
1> else:
2> consider access to the cell as not barred;
1> if access to the cell is barred and both timers T302 and "Tbarring" are not running:
2> draw a random number 'rand' that is uniformly distributed in the range 0≤rand<1;
2> start timer "Tbarring" with the timer value calculated as follows, using the ac-BarringTime included in "AC barring parameter":

"Tbarring"=(0.7+0.6rand)*ac-BarringTime.

During the access barring check initiated by the on-going traffic steered from WLAN to 3GPP LTE, if the UE has to establish the RRC connection for mobile terminating (MT) calls at the same time, the UE may only perform access barring check corresponding to the MT calls. If the UE has to establish the RRC connection for emergency calls at the same time, the UE may only perform access barring check corresponding to the emergency call. If the UE has to establish the RRC connection for newly generated mobile originating (MO) calls at the same time, the UE may only perform access barring check corresponding to the on-going traffic steered from WLAN to 3GPP LTE. If the UE has to establish the RRC connection for RRC connection for MO signaling at the same time, the UE may only perform access barring check corresponding to the on-going traffic steered from WLAN to 3GPP LTE (or alternatively corresponding to the MO signaling). If the UE has to establish the RRC connection for MO CS fallback at the same time, the UE may only perform access barring check corresponding to the on-going traffic steered from WLAN to 3GPP LTE (or alternatively corresponding to the MO CS fallback). If the UE has to establish the RRC connection at the same time and that EAB is applicable, the UE may only perform access barring check corresponding to the on-going traffic steered from WLAN to 3GPP LTE. If the UE is allowed to access the network according to the above barring check for one type of traffic, the UE establishes RRC connection and transmits all the traffic. If the UE is not allowed to access the network according to the above barring check for one type of traffic, the UE considers the cell as barred during a certain time. The UE does not perform additional barring check for another type of traffic.

In step S120, the UE transmits the RRC connection request message if the cell is not barred according to the access barring check. If the upper layer of the UE is informed of barring alleviation for traffic steering from WLAN/MO data/MO signaling/MT call/emergency call, the UE evaluates access network selection and traffic steering rule. If the cell is barred according to the access barring check, the UE informs upper layers about the failure of the RRC connection establishment. And the UE waits to request establishment of an RRC connection by time Tbarring.

Alternatively, in order to differentiate an RRC connection request due to the on-going traffic steered from WLAN to 3GPP LTE, from an RRC connection request initiated by other reasons, the UE, which tries to establish an RRC connection initiated by the on-going traffic steered WLAN to 3GPP LTE may skip ACB mechanism for MO calls/signaling, MT calls, emergency calls, CS fallback and/or delay tolerant access. The network may provide whether the ACB is applied or not for the on-going traffic steered from WLAN to 3GPP LTE via broadcast and/or dedicated signaling.

Figure 7:
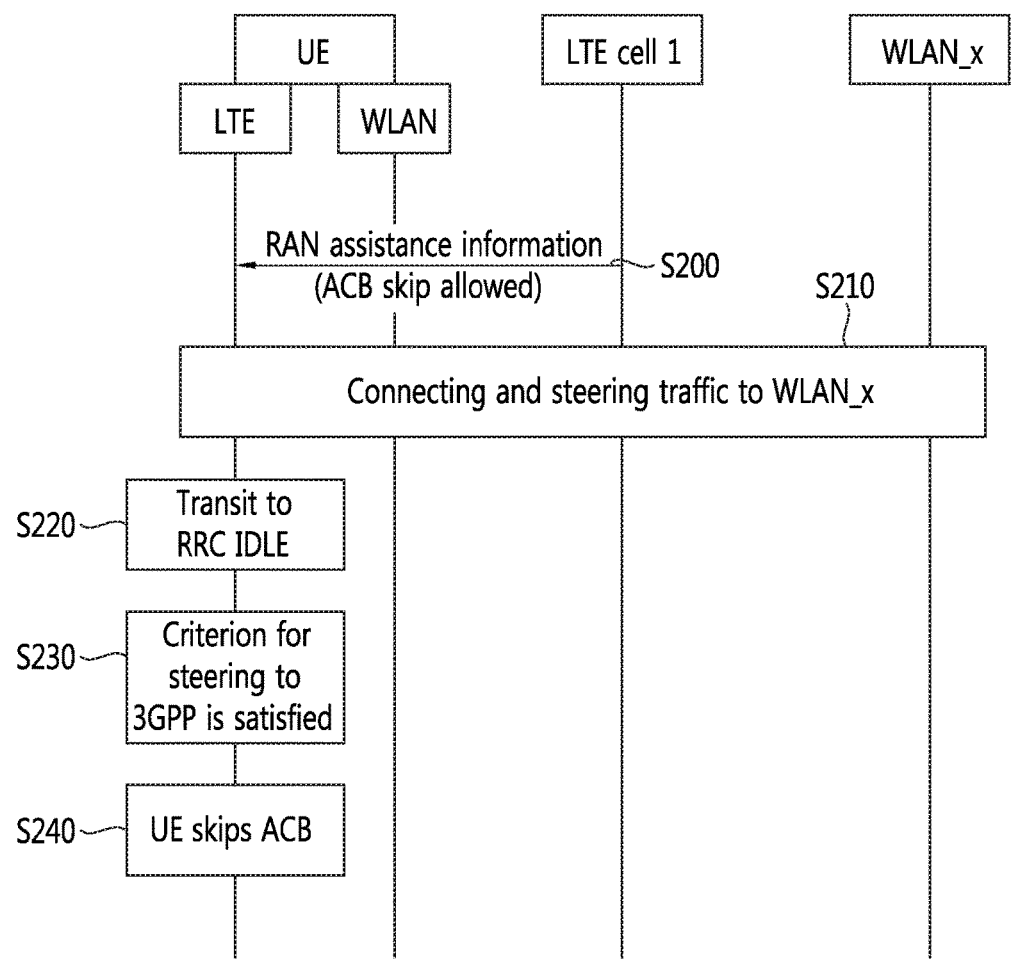
FIG. 7 shows an example of a method for performing access control according to an embodiment of the present invention.

FIG. 7 shows an example of a method for performing access control according to an embodiment of the present invention.

In step S200, the network provides RAN assistance information. The RAN assistance information may include the indication indicating whether the UE is allowed to skip ACB mechanism when the traffic is steered from WLAN to 3GPP LTE. It is assumed that the indication indicates that the UE is allowed to skip ACB mechanism when the traffic is steered from WLAN to 3GPP LTE In step 210, the condition for traffic steering from 3GPP LTE to WLAN is satisfied so that the UE connects with WLAN and steers traffic to WLAN.

In step S220, since there is no traffic in 3GPP LTE, the network releases the RRC connection. The UE transits to RRC_IDLE.

In step S230, based on the RAN assistance information provided by broadcast/dedicated signaling from the network, the traffic steering to 3GPP is triggered.

In step S240, the UE skips ACB mechanism and establishes RRC connection for the on-going traffic steered from WLAN to 3GPP LTE.

Figure 8:
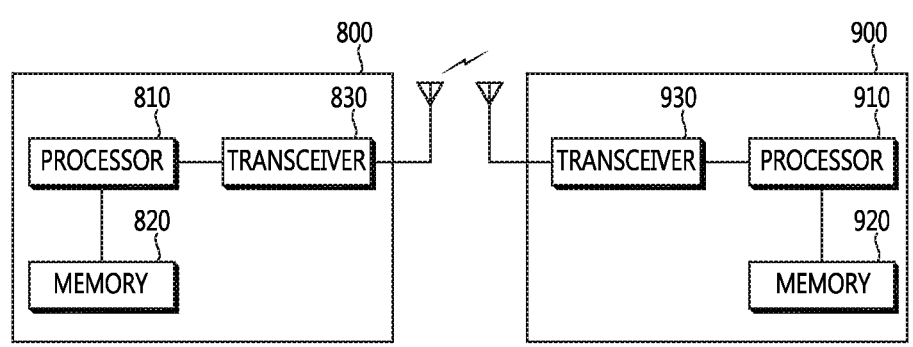
FIG. 8 shows a wireless communication system to implement an embodiment of the present invention.

FIG. 8 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing, by a user equipment (UE), access control in a wireless communication system, the method comprising:
    receiving access class barring information for a traffic steered from a wireless local area network (WLAN) to 3rd generation partnership project (3GPP) long-term evolution (LTE) from a network,
    wherein the access class barring information for the traffic steered from the WLAN to the 3GPP LTE is received via a broadcast signaling, and
    wherein the access class barring information for the traffic steered from the WLAN to the 3GPP LTE includes an access class barring factor and an access class barring time;
    if the UE has to establish a radio resource control (RRC) connection for both the traffic steered from the WLAN to the 3GPP LTE and another connection, performing an access barring check only for the traffic steered from the WLAN to the 3GPP LTE or only for the other connection, depending on a type of the other connection,
    wherein the access barring check performed only for the traffic steered from the WLAN to the 3GPP LTE includes performing the access barring check using the received access class barring information; and
    transmitting a RRC connection request message to the network, if a cell is not barred according to the access barring check.

2. A user equipment (UE) comprising:
    a memory;
    a transceiver; and
    a processor coupled to the memory and the transceiver, and configured to:
        control the transceiver to receive access class barring information for a traffic steered from a wireless local area network (WLAN) to 3rd generation partnership project (3GPP) long-term evolution (LTE) from a network,
        wherein the access class barring information for the traffic steered from the WLAN to the 3GPP LTE is received via a broadcast signaling, and
        wherein the access class barring information for the traffic steered from the WLAN to the 3GPP LTE includes an access class barring factor and an access class barring time;
        if the UE has to establish a radio resource control (RRC) connection for both the traffic steered from the WLAN to the 3GPP LTE and another connection, perform an access barring check only for the traffic steered from the WLAN to the 3GPP LTE or only for the other connection, depending on a type of the other connection,
        wherein the access barring check performed only for the traffic steered from the WLAN to the 3GPP LTE includes performing the access barring check using the received access class barring information; and
        control the transceiver to transmit a RRC connection request message to the network, if a cell is not barred according to the access barring check.

3. The method of claim 1, wherein, if the type of the other connection is a newly generated mobile originating call, the UE only performs the access barring check for the traffic steered from the WLAN to the 3GPP LTE.

4. The method of claim 1, wherein, if the type of the other connection is a mobile terminating call, the UE only performs the access barring check for the mobile terminating call.

5. The method of claim 1, wherein, if the type of the other connection is an emergency call, the UE only performs the access barring check for the emergency call.

6. The method of claim 1, wherein, if the type of the other connection is a mobile originating circuit-switched (CS) fallback, the UE only performs access barring check corresponding to the traffic steered from the WLAN to the 3GPP LTE.

7. The method of claim 1, wherein, if the type of the other connection is a newly generated mobile originating call, and if extended access barring (EAB) is applicable, the UE only performs the access barring check for the traffic steered from the WLAN to the 3GPP LTE.

* * * * *